(12) United States Patent
Chien et al.

(10) Patent No.: US 7,011,293 B2
(45) Date of Patent: Mar. 14, 2006

(54) WATER-SAVING DEVICE FOR A FAUCET

(76) Inventors: Hsin-Feng Chien, No. 57-16, Yung-Fang Rd., Ta-Liao Hsiang, Kaohsiung Hsien (TW); Shuen-Shin Hwang, No. 8, Han-Cheng 7th St., His-Tun Dist., Taichung City (TW)

( * ) Notice: Subject to any disclaimer, the term of this patent is extended or adjusted under 35 U.S.C. 154(b) by 44 days.

(21) Appl. No.: 10/831,692

(22) Filed: Apr. 23, 2004

(65) Prior Publication Data

US 2005/0236600 A1    Oct. 27, 2005

(51) Int. Cl.
*F16K 31/00* (2006.01)
(52) U.S. Cl. .................. 251/236; 251/239; 251/244
(58) Field of Classification Search ............ 251/89, 251/101, 110, 111, 236–246
See application file for complete search history.

(56) References Cited

U.S. PATENT DOCUMENTS

| 1,848,456 | A | * | 3/1932 | Beebe | ........................ | 4/676 |
| 2,830,618 | A | * | 4/1958 | Mitchell | ................ | 137/599.03 |
| 5,230,365 | A | * | 7/1993 | Woltz et al. | ................ | 137/607 |
| 5,384,919 | A | * | 1/1995 | Smith | ........................... | 4/448 |
| 5,386,600 | A | * | 2/1995 | Gilbert, Sr. | ................... | 4/677 |
| 5,941,504 | A | * | 8/1999 | Toma et al. | ................ | 251/295 |
| 6,296,011 | B1 | * | 10/2001 | Esche et al. | ........... | 137/355.25 |

* cited by examiner

*Primary Examiner*—J. Casimer Jacyna
(74) *Attorney, Agent, or Firm*—Christie, Parker & Hale, LLP

(57) ABSTRACT

A water-saving device for a faucet includes a hose and a control assembly connected to the hose and adapted to be located upstream of the faucet. The control assembly includes a housing, a plunger, an operation unit connected to an end portion of the plunger, and a biasing unit disposed in the housing. The housing has inlet and outlet ports, a passage in fluid communication with the inlet and outlet ports, and a valve seat disposed in the passage. The plunger has a valve portion to be seated on the valve seat. The biasing unit moves the valve portion to a closing position in which the valve portion is seated against the valve seat, and the operation unit moves the valve portion to an open position in which the valve portion is moved away from the valve seat.

5 Claims, 7 Drawing Sheets

WATER-SAVING DEVICE FOR A FAUCET

BACKGROUND OF THE INVENTION

1. Field of the Invention

The invention relates to a water-saving device, more particularly to a water-saving device for a faucet.

2. Description of the Related Art

Generally, running water is obtained and controlled through a faucet. However, when a user forgot to close or did not close properly the faucet, water is likely to flow continuously, and is thus wasted. As such, many kinds of water-saving faucets have been developed to overcome the aforementioned drawback. One such faucet is mounted with a push button-type stop valve. The user simply presses down the faucet to effect flow of water, which lasts for about 3 to 5 seconds. Because the flow of water is limited and short, the user usually has to repeatedly press the faucet to accomplish a task, such as washing of the hands, so that the faucet with the push button-type stop valve is relatively inconvenient and troublesome to use.

Another known water-saving faucet is mounted with a sensor, such as an infrared sensor. The user only has to put his hands in front of the faucet to effect continuous flow of the water. When the user's hands are removed from the faucet, the water stops flowing. One of the drawbacks associated with this kind of faucet is that if the sensitivity of the sensor deteriorates, it will delay flow or stop of the water, which similarly results in inconvenience during use of the faucet and wastage of the water when the flow of water cannot be timely stopped.

SUMMARY OF THE INVENTION

Therefore, the object of the present invention is to provide a water-saving device with an operation unit that can control water flowing to a faucet, and that can save water effectively.

According to this invention, a water-saving device for a faucet comprises a hose adapted to supply water to the faucet, and a control assembly connected to the hose and adapted to be located upstream of the faucet. The control assembly includes a housing, a plunger, an operation unit, and a biasing unit. The housing has an inlet port, an outlet port, a passage extending between and in fluid communication with the inlet and outlet ports, and a valve seat disposed in the passage. The plunger is mounted movably within the housing, and has a valve portion to be seated on the valve seat, and an end portion which is opposite to the valve portion and which extends outwardly of the housing. The operation unit is connected to the end portion of the plunger. The biasing unit is disposed in the housing, and biases the valve portion. The biasing unit moves the valve portion to a closing position in which the valve portion is seated against the valve seat, and the operation unit moves the valve portion to an open position in which the valve portion is moved away from the valve seat.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
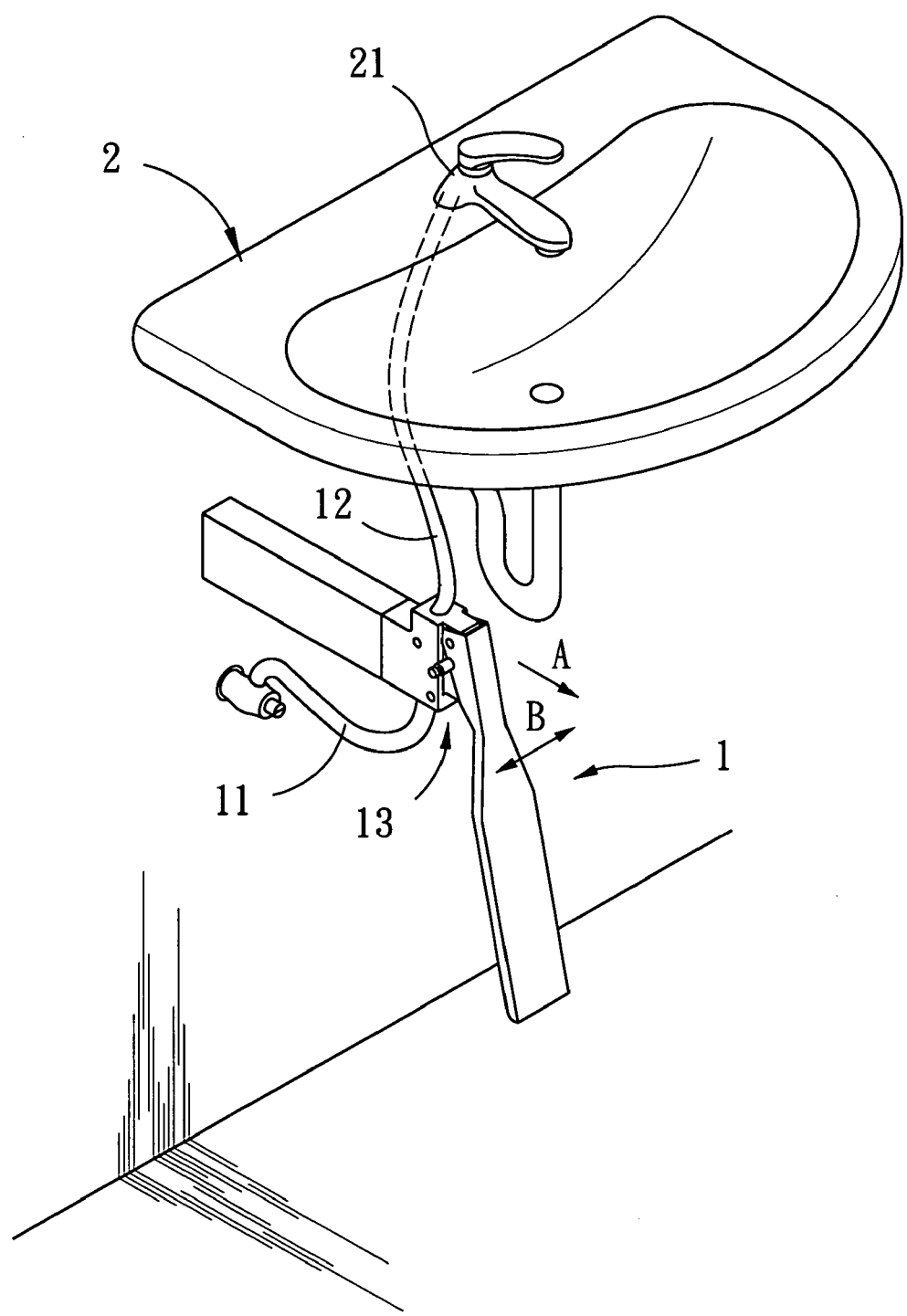
FIG. 1 is a perspective view of the first preferred embodiment of a water-saving device according to the present invention when applied to a faucet on a sink.

Before the present invention is described in greater detail, it should be noted that like elements are denoted by the same reference numerals throughout the disclosure.

Referring to FIGS. 1 to 4, the first preferred embodiment of a water-saving device 1 according to the present invention is adapted to control water flow to a faucet 21 of a sink 2, and is shown to comprise an inlet hose 11 adapted to supply water to the faucet 21, an outlet hose 12 that is in fluid communication with the faucet 21, and a control assembly 13 connected to the inlet and outlet hoses 11, 12 and adapted to be located upstream of the faucet 21.

Figure 2:
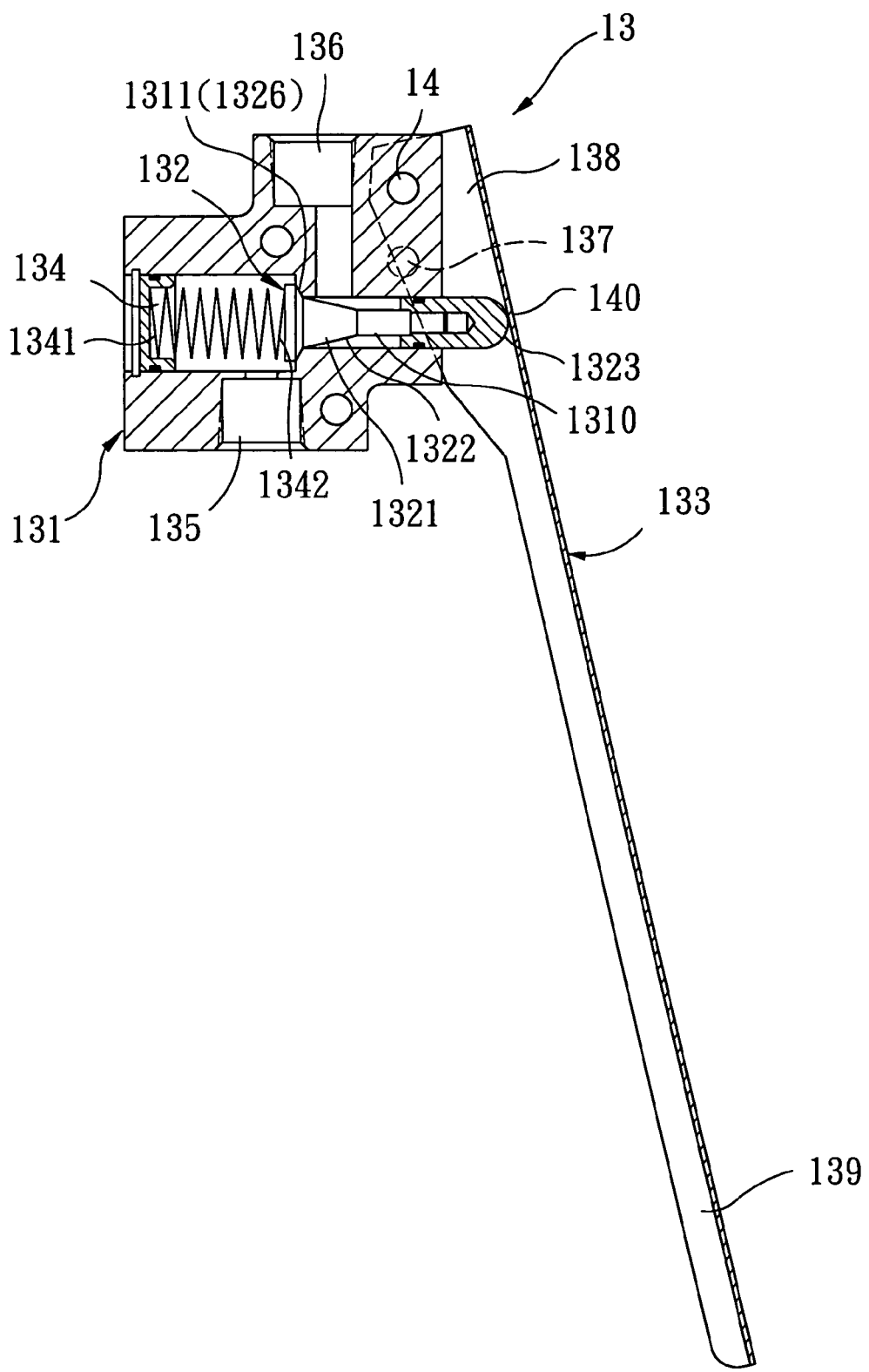
FIG. 2 is a sectional view of the first preferred embodiment, illustrating a plunger in a closing position.
Figure 3:
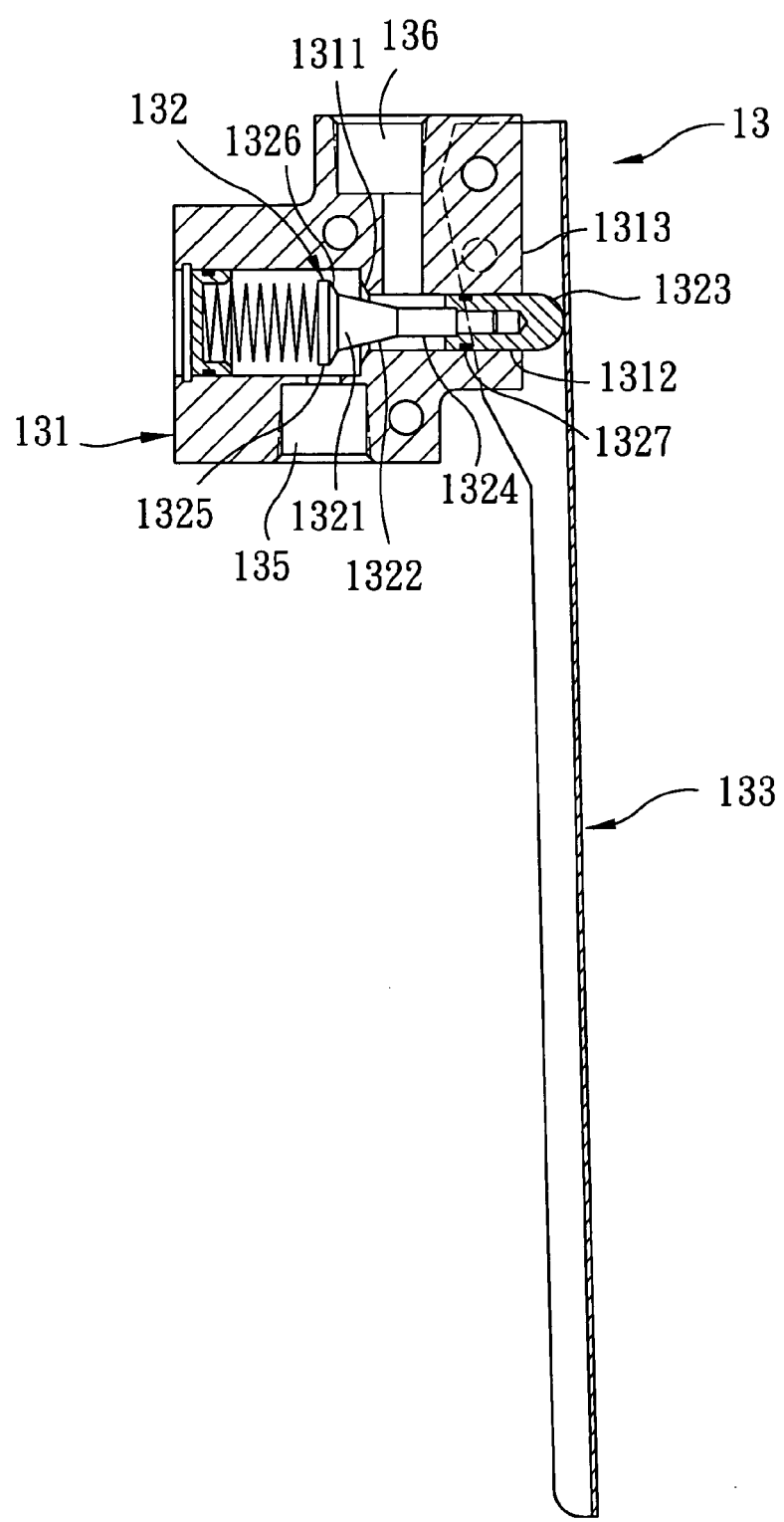
FIG. 3 is a view substantially similar to FIG. 2, but showing the plunger when pushed by an operation unit so as to press against a biasing unit.

The control assembly 13, as shown in FIG. 2, includes a housing 131, a plunger 132, an operation unit, and a biasing unit 134.

The housing 131 has an inlet port 135 that is in fluid communication with the inlet hose 11, an outlet port 136 that is in fluid communication with the outlet hose 12, a passage 1310 extending between and in fluid communication with the inlet and outlet ports 11, 12, and a valve seat 1311 disposed in the passage 1310.

The plunger 132 is mounted movably within the housing 131, and has a valve portion 1321 to be seated on the valve seat 1311, an end portion 1323 which is opposite to the valve portion 1321 and which extends outwardly of the housing 131, and a stem portion 1324 (see FIG. 3) connected between the end portion 1323 and the valve portion 1321. The valve portion 1321 has a tapered section 1322 connected to the stem portion 1324, an enlarged section 1325 (see FIG. 3) formed at one side of the tapered section 1322 opposite to the stem portion 1324, and a slanted shoulder 1326 (see FIGS. 2 and 3) that is connected between the tapered section 1322 and the enlarged section 1325 and that converges from the enlarged section 1325 to the tapered section 1322.

The housing 131 further has a through hole 1312 (see FIG. 3) communicated with the passage 1310 to receive and permit the end portion 1323 of the plunger 132 to extend out of the housing 131, and a wall 1313 (see FIG. 3) confining the through hole 1312. The end portion 1323 of the plunger 132 is in sliding contact with the wall 1313, and has a sealing ring 1327 (see FIG. 3) disposed around the end portion 1323 and between the end portion 1323 and the wall 1313.

The operation unit is connected to the end portion 1323 of the plunger 132. In this embodiment, the operation unit includes a lever 133 having a pivot end portion 138 connected pivotally to the housing 131 through a pivot pin 14, a free end 139 opposite to the pivot end portion 138, and a press portion 140 between the pivot end portion 138 and the free end 139 to press the end portion 1323 of the plunger 132.

The biasing unit 134 is disposed in the housing 131, and biases the valve portion 1321 of the plunger 132. In this embodiment, the biasing unit 134 is configured as a compression spring, which has a first end 1341 fixed to the housing 131, and a second end 1342 opposite to the first end 1341 and abutting against the valve portion 1321 so as to push the valve portion 1321 against the valve seat 1311 and to push outwardly the end portion 1323 of the plunger 132.

Figure 4:
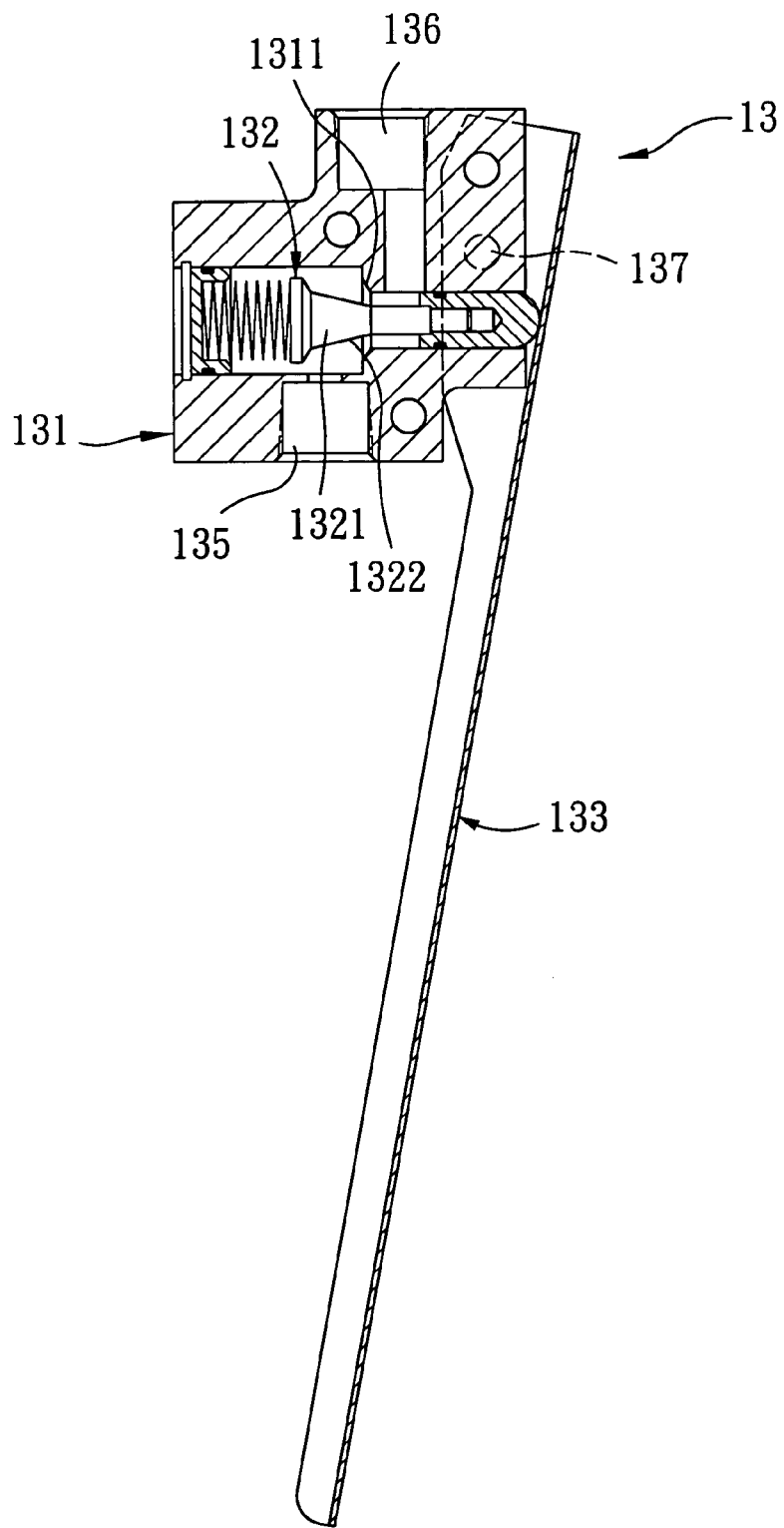
FIG. 4 is a view substantially similar to FIG. 2, but showing the plunger in an open position.

Through coordination of the lever 133 and the biasing unit 134, the plunger 132 can be moved from a closing position shown in FIG. 2 to an open position shown in FIG. 4. Particularly, the biasing unit 134 moves the valve portion 1321 of the plunger 132 to the closing position in which the valve portion 1321 is seated against the valve seat 1311 of the housing 131 with the slanted shoulder 1326 of the valve portion 1321 in contact with the valve seat 1311, whereas the lever 133 of the operation unit presses the end portion 1323 and moves the valve portion 1321 to the open position in which the valve portion 1321 is moved away from the valve seat 1311.

When the plunger 132 is disposed at the closing position, the inlet and outlet ports 135, 136 are not in fluid communication with each other so that water cannot pass from the inlet port 135 to the outlet port 136. When the plunger 132 is disposed at the open position, the inlet and outlet ports 135, 136 are in fluid communication with each other so that water can pass through the inlet port 135, the passage 1310, and into the outlet port 136.

Referring once again to FIGS. 3 and 4, when the plunger 132 moves gradually toward the open position, the space between the tapered section 1322 of the valve portion 1321 of the plunger 132 and the valve seat 1311 of the housing 131 gradually increases, so that the amount of water entering the outlet port 136 also increases, thereby gradually providing a large amount of water outflow. When the plunger 132 is located at the fully open position, the space between the tapered section 1322 of the valve portion 1321 of the plunger 132 and the valve seat 1311 of the housing 131 is at a maximum, so that the amount of water entering the outlet port 136 is the largest, thereby providing the largest amount of water outflow. Thus, the amount of water entering the outlet port 136 can be controlled by varying the space between the tapered section 1322 of the valve portion 1321 of the plunger 132 and the valve seat 1311 of the housing 131.

Figure 5:
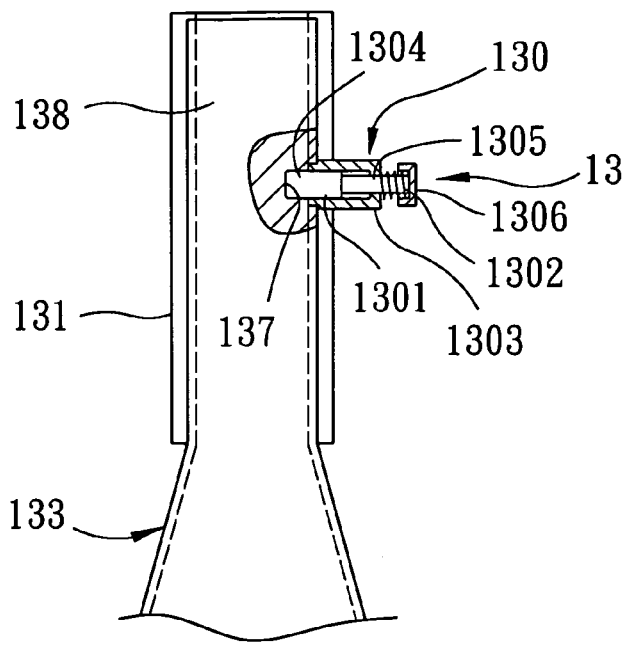
FIG. 5 is a fragmentary partly sectional view of the first preferred embodiment, illustrating a latch member of a latch unit extending through a latch hole in a housing.
Figure 6:
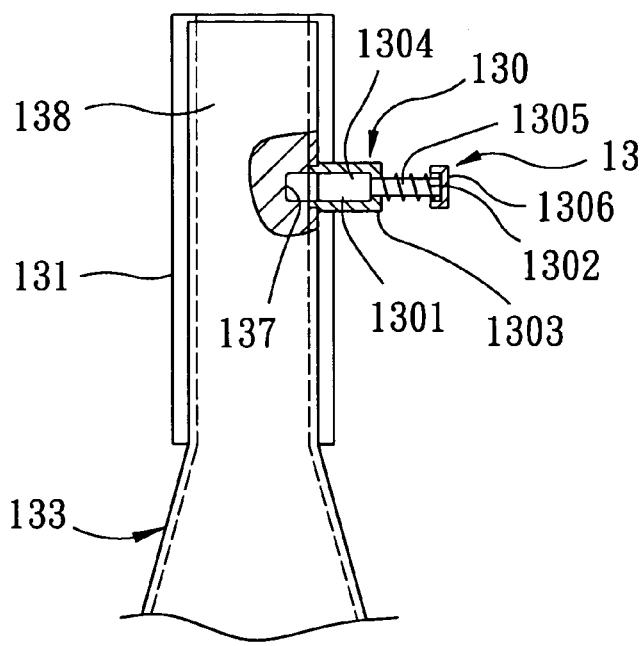
FIG. 6 is a view substantially similar to FIG. 5, but showing the latch member when moved away from the latch hole.

Referring to FIGS. 5 and 6, the control assembly 13 further includes a latch unit 130 disposed on the pivot end portion 138 of the lever 133. The housing 131 is formed with a latch hole 137 (see also FIGS. 2 and 4) between the end portion 1323 of the plunger 132 and the pivot end portion 138 of the lever 133 for receiving the latch unit 130. In this embodiment, the latch unit 130 includes a latch casing 1303 mounted on the lever 133, and a latch member 1301 disposed movably in the latch casing 1303. The latch member 1301 has a head portion 1304 extending into the latch hole 137, a cap 1306 opposite to the head portion 1304, a shank portion 1305 between the head portion 1304 and the cap 1306 and extending out of the latch casing 1303, and a spring member 1302 that is sleeved on the shank portion 1305 between the latch casing 1303 and the cap 1306 and that biases the cap 1306 to move away from the latch casing 1303 when the plunger 132 is moved to the closing position.

When the plunger 132 is at the open position, the latch unit 130 is inserted into the latch hole 137, so that the plunger 132 is positioned thereat.

When water is desired for washing hands, the faucet 21 is opened first. Then, the user uses his knee or leg to push the free end 139 of the lever 133 toward the housing 131. The press portion 140 of the lever 133, in turn, pushes the end portion 1323 of the plunger 132 so as to move the plunger 132 to the open position shown in FIG. 4. At this time, the plunger 132 compresses the biasing unit 134 so that the biasing unit 134 can store a restoring force, and the valve portion 1321 of the plunger 132 is moved away from the valve seat 1311 of the housing 131 so that the inlet and outlet ports 135, 136 can communicate fluidly with each other. Subsequently, water from the inlet hose 11 flows smoothly through the inlet port 135, the passage 1310, and the outlet port 135, 136, and flows continuously through the outlet hose 12 and out of the faucet 21.

When it is desired to stop the flow of water, the user simply releases the free end 139 of the lever 133. The biasing unit 134, at this time, releases its restoring force to push the plunger 132 to the closing position shown in FIG. 2 so as to block the communication between the inlet and outlet ports 135, 136. As such, water from the inlet hose 11 cannot flow through the outlet hose 12, and the faucet 21 stops providing water. The user can tightly close the faucet 21 afterwards. Even if the faucet 21 is not tightly closed, water will not flow out of the faucet 21.

Alternatively, when it is desired to use water for a relatively long period of time, with his knee still pressing the lever 133 to place the plunger 132 at the open position, the user may push the latch member 1301 of the latch unit 130 through the cap 1306 and into the latch hole 137 in the housing 131 so as to prevent the plunger 132 from rotating. Because the force of the biasing unit 134 is applied to the lever 133 in a direction shown by an arrow (A) in FIG. 1, which is substantially perpendicular to the direction of movement of the latch member 1301 shown by an arrow (B) in FIG. 1, and because the biasing force of the biasing unit 134 is substantially larger than that of the spring member 1302 of the latch unit 130, the latch member 1301, which has been inserted into the latch hole 137, is pressed tightly against the wall of the latch hole 137, and is thus prevented from moving out of the latch hole 137. At this time, the user's knee can be removed from contact with the lever 133, and water flows continuously out of the faucet 21 since the plunger 132 is maintained at the open position by the lever 133.

When stoppage of water is desired, the lever 133 is slightly pressed so as to loosen the head portion 1304 from the latch hole 137. The spring member 1302 then biases the cap 1306 to move away from the latch casing 1303 bringing along the head portion 1304 so that the head portion 1304 is moved away from the latch hole 137. The lever 133 is not limited at this time so that it can be restored to its original position, and releases its pressing force against the plunger 132. The plunger 132, in turn, is biased by the biasing unit 134 to move toward the closing position, thereby stopping flow of water through the faucet 21.

Figure 7:
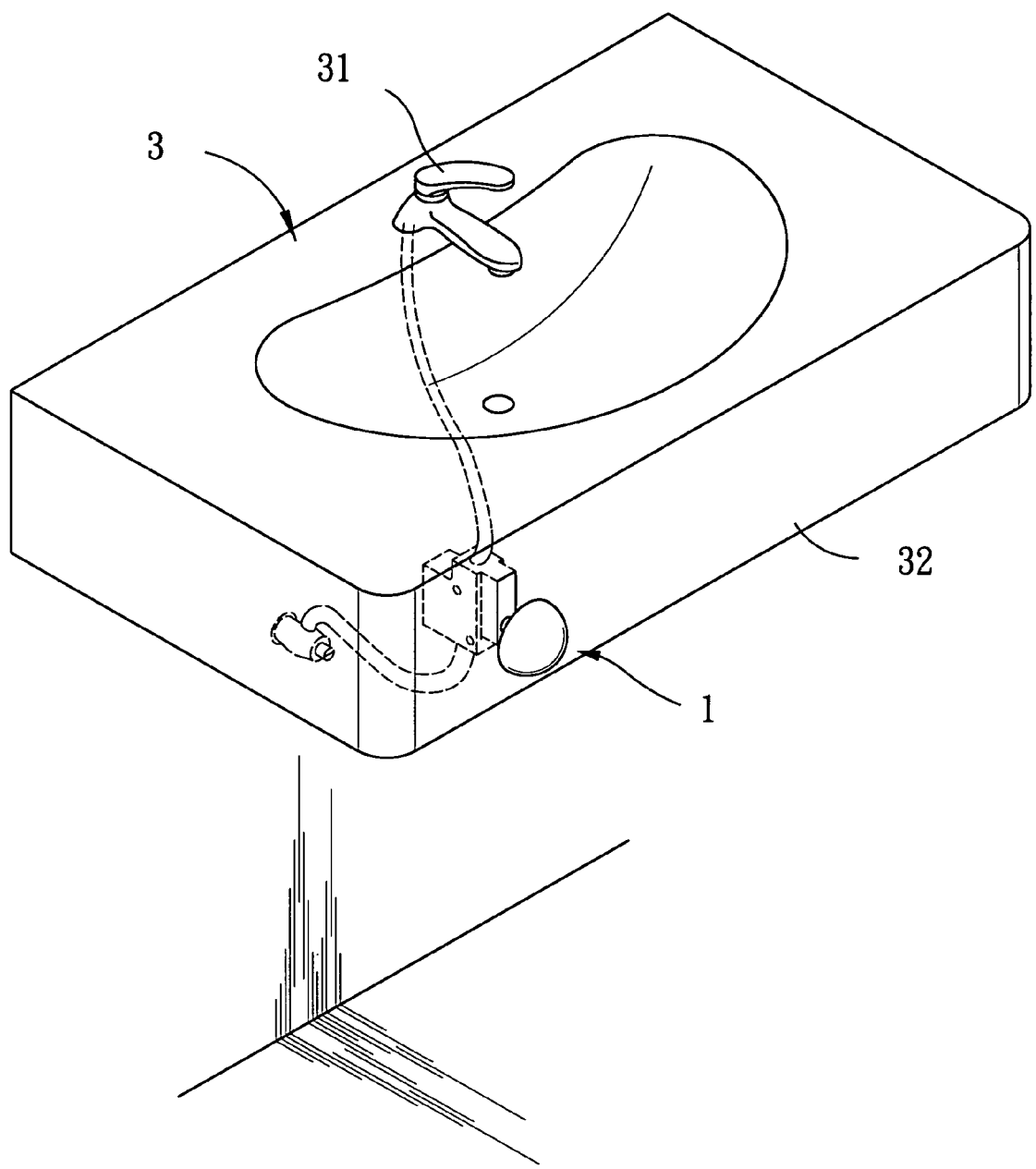
FIG. 7 is a perspective view of a sink incorporating the second preferred embodiment of a water-saving device according to the present invention.
Figure 8:
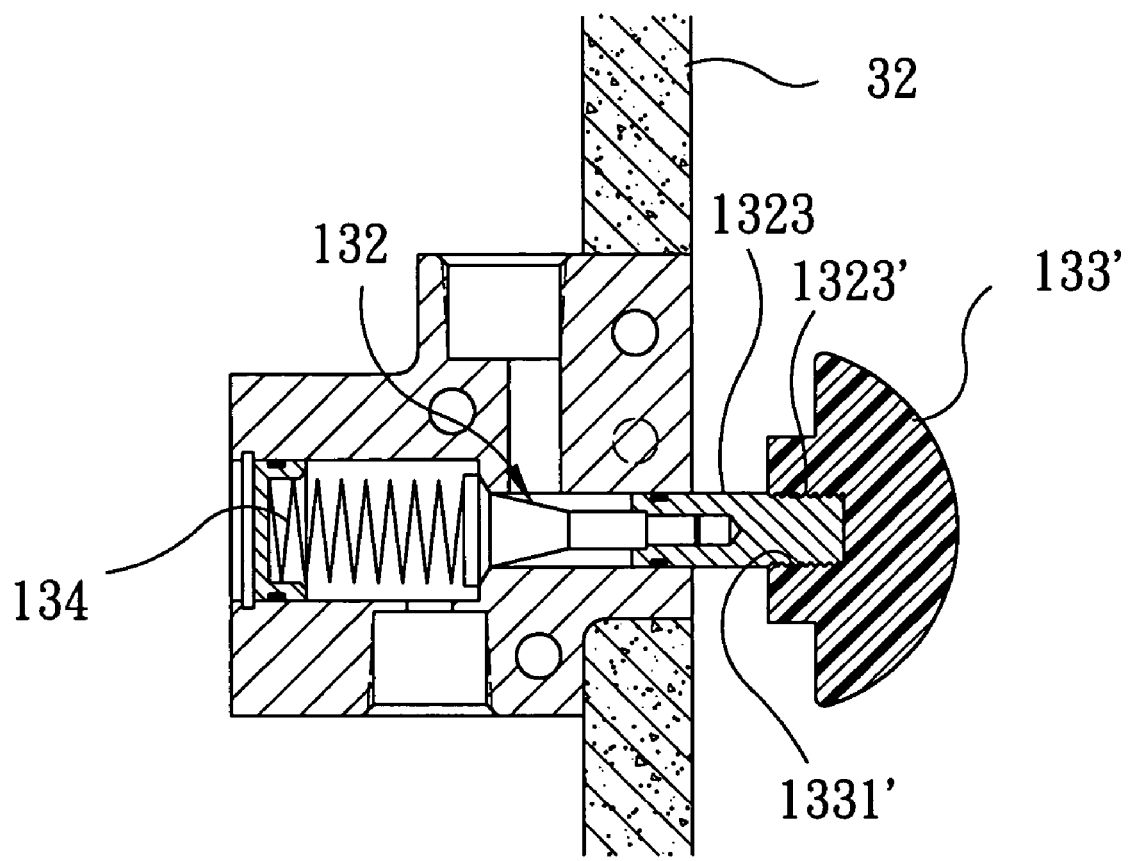
FIG. 8 is a sectional view of the second preferred embodiment.

Referring to FIGS. 7 and 8, the second preferred embodiment of a water-saving device 1 according to the present invention is shown to be substantially similar to the first preferred embodiment, and is adapted to be installed on a sink 3. However, in this embodiment, the operation unit includes a knob 133' having an internally threaded hole 1331'. The end portion 1323 of the plunger 132 is formed with an externally threaded portion 1323' that engages the internally threaded hole 1331' so that the knob 133' is fixed threadedly on the plunger 132. The water-saving device 1 of this embodiment is directly fixed to a wall 32 of the sink 3 so that the knob 133' is located externally of the wall 32.

When the user requires water from a faucet 31, any part of the user's body can press the knob 133' so that the knob 133' can directly push the plunger 132 to the open position. When stoppage of the water is desired, the pressure on the knob 133 is simply released. Through the biasing force of the biasing unit 134, the plunger 132 is moved to the closing position, thereby stopping supply of water.

From the aforementioned description of the preferred embodiments of the present invention, it is apparent that flow of the water from the faucet 21, 31 can be controlled and stopped as desired through cooperation of the operation unit and the biasing unit 134, which can move the plunger 132 swiftly from the closing position to the open position, and vice versa. Furthermore, the duration of the water flow can be effectively controlled as well by virtue of the latch unit 130. Moreover, contact with the faucet 21, 31 is minimized because the faucet 21, 31 is opened only during use and it is not required for the user to close the same afterwards. Since contact of the user's hands with the faucet 21, 31 is reduced, the risk of transmission of infectious diseases is also reduced such that the present invention is safe and convenient to use.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A water-saving device for a faucet, comprising:
   a hose adapted to supply water to the faucet; and
   a control assembly connected to said hose and adapted to be located upstream of the faucet, said control assembly including:
   a housing having an inlet port, an outlet port, a passage extending between and in fluid communication with said inlet and outlet ports, and a valve seat disposed in said passage,
   a plunger mounted movably within said housing, and having a valve portion to be seated on said valve seat, and an end portion which is opposite to said valve portion and which extends outwardly of said housing,
   an operation unit connected to said end portion of said plunger, and
   a biasing unit disposed in said housing and biasing said valve portion,
   wherein said biasing unit moves said valve portion to a closing position in which said valve portion is seated against said valve seat, and said operation unit moves said valve portion to an open position in which said valve portion is moved away from said valve seat,
   wherein said biasing unit is configured as a compression spring which has a first end fixed to said housing and a second end abutting against said valve portion so as to push said valve portion against said valve seat and to push outwardly said end portion of said plunger,
   wherein said housing has a through hole communicated with said passage to receive and permit said end portion of said plunger to extend out of said housing, and a wall confining said through hole, said end portion being in sliding contact with said wall and having a sealing ring which is disposed around said end portion and between said end portion and said wall, and
   wherein said plunger has a stem portion connected between said end portion and said valve portion, said valve portion having a tapered section connected to said stem portion, an enlarged section formed at one side of said tapered section opposite to said stem portion, and a slanted shoulder connected between said tapered section and said enlarged section and converging from said enlarged section to said tapered section, said slanted shoulder being in contact with said valve seat when said valve portion is in said closing position.

2. The water-saving device as claimed in claim 1, wherein said operation unit includes a lever having a pivot end portion connected pivotally to said housing, a free end opposite to said pivot end portion, and a press portion disposed between said free end and said pivot end portion to press said end portion of said plunger.

3. The water-saving device as claimed in claim 2, wherein said housing is formed with a latch hole between said end portion of said plunger and said pivot end portion of said lever, said control assembly further including a latch unit disposed on said pivot end portion, said latch unit extending into said latch hole when said plunger is disposed at said open position so as to position said plunger thereat.

4. A water-saving device for a faucet, comprising:
   a hose adapted to supply water to the faucet; and
   a control assembly connected to said hose and adapted to be located upstream of the faucet, said control assembly including:
   a housing having an inlet port, an outlet port, a passable extending between and in fluid communication with said inlet and outlet ports, and a valve seat disposed in said passable,
   a plunger mounted movably within said housing, and having a valve portion to be seated on said valve seat, and an end portion which is opposite to said valve portion and which extends outwardly of said housing,
   an operation unit connected to said end portion of said plunger, and
   a biasing unit disposed in said housing and biasing said valve portion,
   wherein said biasing unit moves said valve portion to a closing position in which said valve portion is seated against said valve seat, and said operation unit moves said valve portion to an open position in which said valve portion is moved away from said valve seat,
   wherein said biasing unit is configured as a compression spring which has a first end fixed to said housing and a second end abutting against said valve portion so as to push said valve portion against said valve seat and to push outwardly said end portion of said plunger,
   wherein said plunger has a stem portion connected between said end portion and said valve portion, said valve portion having a tapered section connected to said stem portion, an enlarged section formed at one side of said tapered section opposite to said stem portion, and a slanted shoulder connected between said tapered section and said enlarged section and converging from said enlarged section to said tapered section, said slanted shoulder being in contact with said valve seat when said valve portion is in said closing position, and
   wherein said latch unit includes a latch casing mounted on said lever, and a latch member disposed movably in said latch casing, said latch member having a head portion extending into said latch hole, a cap opposite to said head portion, a shank portion between said head portion and said cap and extending out of said latch casing, and a spring member sleeved on said shank portion between said latch casing and said cap and biasing said cap to move away from said latch casing.

5. The water-saving device as claimed in claim 1, wherein said operation unit is a knob having an internally threaded hole, said end portion of said plunger being formed with an externally threaded portion that engages said internally threaded hole.

* * * * *